US006101370A

United States Patent [19]

Eaton et al.

[11] Patent Number: 6,101,370

[45] Date of Patent: Aug. 8, 2000

[54] METHOD AND APPARATUS USED IN A SIMULCAST RADIO COMMUNICATION SYSTEM FOR PROVIDING IMPROVED LOCAL TIME

[75] Inventors: Eric Thomas Eaton, Lake Worth, Fla.; Michael J. Deluca, Austin, Tex.; David F. Willard, Plantation, Fla.

[73] Assignee: Motorola, Schaumburg, Ill.

[21] Appl. No.: 09/110,215

[22] Filed: Jul. 6, 1998

[51] Int. Cl.[7] .......... H04B 7/00

[52] U.S. Cl. .......... 455/38.1; 455/503; 340/825.44; 368/47

[58] Field of Search .......... 455/503, 31.1, 455/38.1, 38.2, 38.4; 340/825.44, 311.1; 368/21, 46, 47, 10, 13, 4

[56] References Cited

U.S. PATENT DOCUMENTS 5,089,814 2/1992 DeLuca et al. .......... 340/825.44
5,309,500 5/1994 Koma et al. .......... 368/47
5,774,057 6/1998 Kalbermatter .......... 455/31.1

*Primary Examiner*—Doris H. To
*Attorney, Agent, or Firm*—James A. Lamb

[57] ABSTRACT

A technique is used in a simulcast radio communication system (200) for providing improved local time information. The technique includes, in a fixed portion (300) of the simulcast radio communication system (200), alternatively transmitting in a radio signal a first local time and a second local time in a predetermined protocol position that occurs periodically in a signaling protocol, wherein the first local time and second local time differ by a time zone interval. A radio (500) that receives the radio signal presents local time to a user in manner that indicates the first and second local times.

28 Claims, 7 Drawing Sheets

200

100

METHOD AND APPARATUS USED IN A SIMULCAST RADIO COMMUNICATION SYSTEM FOR PROVIDING IMPROVED LOCAL TIME

FIELD OF THE INVENTION

This invention relates in general to methods of providing local time information to radio users of a communication system, and in particular to a signaling protocol technique and a selective call radio time recovery technique that together improve the presentation of local time to a user near a time zone boundary.

BACKGROUND OF THE INVENTION

A known technique of providing local time information to selective call radios, such as pagers, that are used in wide area simulcast communication systems is to periodically include a local time in a signaling protocol transmitted from a plurality of transmitters. The well known FLEX™ signaling protocol is an example of such a signaling protocol. In a typical metropolitan simulcast communication system, all the coverage area is within one time zone. The local time is accurately determined, for example, from a Global Positioning System satellite, and used in the protocol of the radio signals transmitted by all the transmitters in the system. For example, the local time periodically transmitted in a FLEX™ signaling protocol from all the transmitters in a communication system covering the Los Angeles area would be made current with reference to the time for the Pacific Time Zone. However, in a simulcast communication system that has coverage in more than one time zone, a problem exists in that the local time transmitted is not correct in all portions of coverage of the system. This is illustrated in FIG. 1, which is an idealized coverage map showing coverage of a portion of a plurality of radio transmitters used in a prior art simulcast radio communication system 100 near a time zone border 120. The time zone border 120 in this example is the border between the Central Time Zone (CTZ) and Eastern Time Zone (ETZ) in the United States. Coverage areas (or cells) 111–119 of ten transmitters are illustrated with circular boundaries, which are idealized representations of real boundaries at which the reliability of receiving a message falls below a predetermined limit. The simulcast radio communication system 100 further comprises selective call radios (SCRs), of which six SCRs 131–136 are shown in FIG. 1. It will be appreciated that the concepts described herein using the idealized representations are equally valid for real cells having boundaries that are non-circular. Because the radio communication system 100 is a simulcast system, the six SCRs 131–136 shown in FIG. 1 are all adjusted to receive at a common frequency. The local time for the ETZ is transmitted periodically, for example every four minutes, by all transmitters in the simulcast radio communication system 100, including the transmitters for cells 111–119 shown in FIG. 1. This is indicated by the use of horizontal cross hatch lines in FIG. 1. ETZ time was chosen because a preponderance of the geographic coverage of the simulcast radio communication system 100 is in the ETZ. SCRs 132, 134, 136 are located in overlap regions between two cells, indicated by the denser horizontal cross hatch lines. In a well adjusted simulcast system, SCRs in the overlap regions will receive signal with approximately the same reliability as SCRs located in non-overlap regions. SCRs 131–134 are located in the CTZ, and SCRs 135, 136 are located in the ETZ. Accordingly, SCRs 131–134 receive a wrong local time, while SCRs 135, 136 will typically receive the correct local time.

In accordance with one variation of the prior art simulcast radio communication system 100 described above, an additional bit is used in the protocol transmitted by all the transmitters of the simulcast radio communication system 100 that identifies the system as extending over at least one time zone boundary, thereby alerting a user that the time received may not be accurate. Users who use the system regularly and are aware of which time zone they are in can therefore deduce the correct time. However, users who use the system infrequently, and particularly visiting users (roaming users), are likely to be confused about the correct time local time, although they can be alerted to the situation.

Thus, what is needed is a method for improving the presentation of local time information in a simulcast radio communication system.

DETAILED DESCRIPTION OF THE PREFERRED EMBODIMENT

Figure 1:
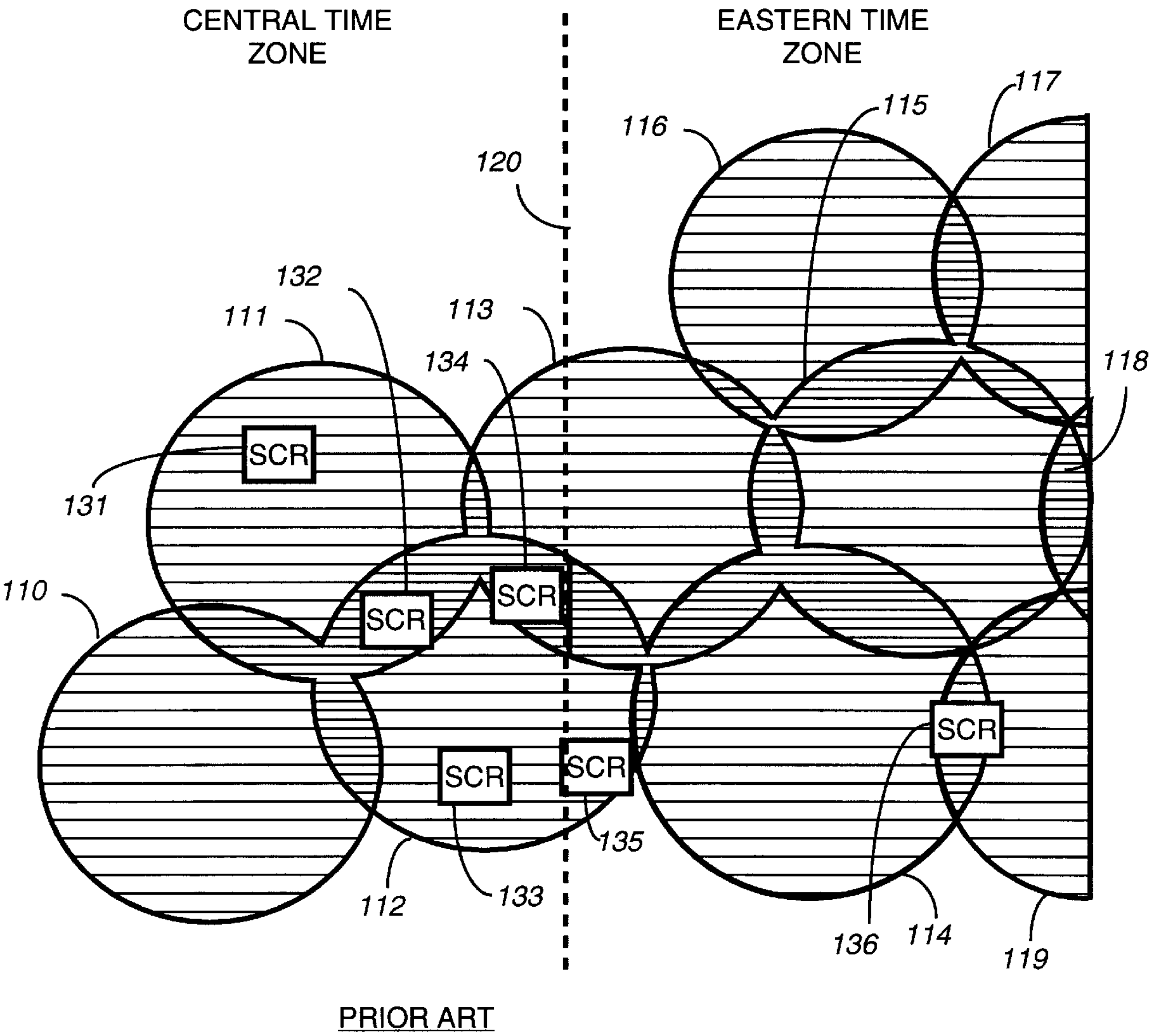
FIG. 1 is an idealized coverage map showing coverage of a portion of a plurality of radio transmitters used in a prior art simulcast radio communication system.
Figure 2:
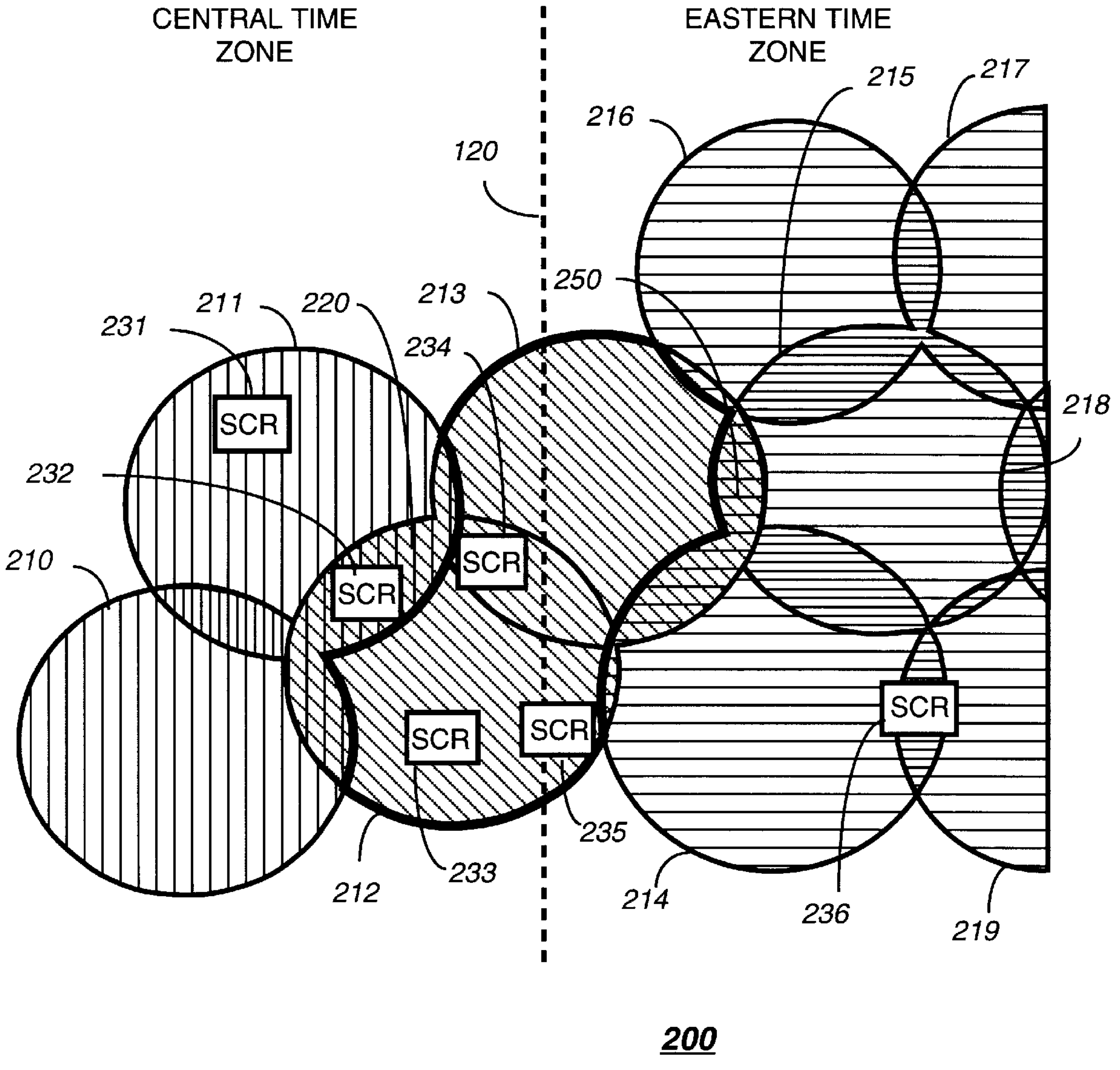
FIG. 2 is an idealized coverage map showing coverage of a portion of a plurality of radio transmitters used in a simulcast radio communication system, in accordance with the preferred and alternative embodiments of the present invention.

Referring to FIG. 2, an idealized coverage map showing coverage of a portion of a simulcast radio communication system 200 near the time zone border 120 is shown, in accordance with the preferred and alternative embodiments of the present invention. Ten transmitters are located in the same position, operate in a simulcast manner, and provide the same amount of coverage as that shown in FIG. 1 for the ten cells 110–119 of the simulcast radio communication system 100. The six selective all receivers (SCRs) 231–236 shown in FIG. 2 are all adjusted to receive at common frequency, and include a unique method that sets a local time zone mode, more fully described below. In accordance with the preferred and alternative embodiments of the present invention, a first local time, in this example CTZ time, is transmitted periodically by the transmitters for cells 210, 211, and a second local time, in this example ETZ time, is transmitted by the transmitters for cells 214–219. The periodicity is four minutes in this example, but it will be appreciated that the present invention will work in systems using other periods. The local times are transmitted in a predetermined protocol position, which is preferably a block information word of one of the protocols in the well known FLEX™ family of protocols. Because cells 212, 213 straddle the time zone border 120, the two transmitters for cells 212, 213 alternatively transmit the first local time and the second local time every four minutes (i.e., the period between transmissions of the first local time is eight minutes), in the same predetermined protocol position in the block information word used by the transmitters for cells 210, 211, 214–219. It will be appreciated that for each cell 212, 213, the transmissions are from a transmitter (in cells 212, 213, respectively) that provides coverage in a portion of a time zone and a portion of an adjacent time zone. The cells 212, 213 are also called time zone boundary cells. The two transmitters for cells 212, 213 are set up such that both send the CTZ time simultaneously and both send the ETZ time simultaneously. It will be appreciated that in some large simulcast radio communication systems situated across a time zone boundary, there could be several or many time zone boundary cells, and that in most such systems, there would be a much larger number of nontime zone boundary cells. For example, at 2:00 PM CTZ time is transmitted in the predetermined protocol position in cells 210–211 and ETZ time is transmitted in the predetermined protocol position in cells 212–219. At 2:04 PM, CTZ time is transmitted in the predetermined protocol position in cells 210–213 and ETZ time is transmitted in the predetermined protocol position in cells 214–219.

SCR 231 is located in the CTZ and is located within cell 211 so that it periodically receives the signal only from the transmitter of the cell 211. Therefore, the correct local time, CST, is received in consecutive periodic transmissions of the signaling protocol, recovered by the SCR 231, and presented to the user of SCR 231. SCR 236 is located in the ETZ and is located within an overlap region of cells 214 and 219. In this example, the simulcast radio communication system is well adjusted, so SCR 236 periodically receives a signal including the ETZ local time, every four minutes. Accordingly, the correct local time, ETZ time, is recovered and presented to the user of SCR 236.

SCRs 233 and 235 are located, respectively, in the CTZ and ETZ in a portion of cell 212 that does not overlap other cells. The SCRs 233 and 235 determine the local time zone mode to be in a "boundary zone" mode because the local time information received during alternating transmissions of the predetermined protocol position differs by a time zone interval. The time zone interval is determined by taking into account the duration between successive transmissions of the predetermined protocol position and a time zone difference or no time zone difference. The time zone difference is the time difference between the two time zones. In this example, the duration between successive transmissions of the predetermined protocol position is four minutes because consecutive transmission cycles are four minutes apart. The time zone difference is normally plus or minus one hour, although other intervals can exist due to such factors as daylight savings time. Thus the time zone interval is determined to have occurred when a difference of −56, +4, or +64 minutes occurs when a previously received time is subtracted from a later received time. For example, when the SCR 233 compares an ETZ time with a previously received CTZ time, two representative times could be 4:04 PM (ETZ) and 3:00 PM (CTZ), for which the difference is 64 minutes, and when the SCR 233 compares a CTZ time with a previously received ETZ time, two representative times could be 3:08 PM (CTZ) and 4:04 PM (ETZ), for which the difference is −56 minutes. When a time zone interval is determined for times in the same time zone, the time zone interval is +4 minutes. The SCRs 233, 235 present an indication of both the local time and the adjacent time zone time to a user during the boundary zone mode (when a time zone interval is found), allowing the user to draw a conclusion that the correct local time is one of the two times indicated. The indication of both times is given, for example, by alternatively displaying the two different local times to the user every second.

SCR 234 is located in the CTZ and is located within an overlap region of both cells 212 and 213. SCR 234 will normally receive a radio signal that includes the same time information that is in the signals received by SCRs 233, 235 and SCR 234 will therefore determine that it is located within a boundary zone, for the same reason. By "normally", it is meant that in a well adjusted simulcast system, the reliability of receiving a good signal is approximately the same as receiving a good signal within other comparable regions (i.e., near a boundary) of the cells that are not overlap regions of the cells. SCR 234 will therefore indicate the existence of the boundary zone mode to the user because it alternatively receives the time from the ETZ and CTZ.

SCR 232 is located in the CTZ and is located in portions of cell 211 and cell 212 that overlap. Depending on relative signal strengths from the transmitter of each cell 211, 212, SCR 232 will receive local time information from one of the signals transmitted by the transmitters for cells 211, 212, or from neither, when both signals are received with approximately equal strength. (Note that the SCR 232 will normally receive all other information in the radio signal not included in the words that include the time information, because that information is the same in both signals.) When SCR 232 receives only the time information from the transmitter of cell 211, then it will receive essentially the same local time in consecutive four minute protocol positions; it will determine that the local time zone mode is a "single time zone" mode and it will present a correct local time, CTZ time, to the user of SCR 232. When SCR 232 receives only the time information from the transmitter of cell 212, then it will determine that the boundary zone mode exists, as described above for SCRs 233, 236, and indicate both the local CTZ time and ETZ time to the user of SCR 232.

When SCR 232 receives both radio signals with approximately equal strength, it will be appreciated that the SCR 232 typically receives one or more errors in the local time information portion of the signaling protocol during the alternative periods when the transmitter for cell 212 transmits the ETZ time and the transmitter for cell 211 transmits the CTZ time, but it will typically receive correct local time, CTZ time, in the intervening alternative periods. The SCR 232 determines that the single time zone mode exists in this situation when, during three consecutive periodic transmissions of the predetermined protocol position, local time information that differs by two periods is received (in this example, eight minutes) during two non-consecutive transmissions that indicate a first local time and the remaining transmission indicates one or more errors. In this situation, the SCR 232 enters the single time zone mode and presents the first local time, CTZ time.

In summary, it will be appreciated that any SCR operating within the simulcast radio communication system 200 anywhere inside the region (the area within the boundary cells 212, 213 shown by a heavy, irregular boundary line) along the time zone border 120 essentially always presents an indication to the user that the SCR is within one of the two time zones. Any SCR operating in an overlap region 220, 250 between a time zone boundary cell and a non-time zone boundary cell will present to the user either the correct time zone time or provide to the user information as to the two times that are possible, depending on the relative signal strengths of the signals received by the SCR. Any SCR operating within all other regions of non-time zone boundary cells essentially always presents a correct local time to the user. It will be appreciated that the portion of the simulcast radio communication system 200 in which the user receives an indication that the local time is ambiguous comprises only a portion of each cell that straddles the time zone border 120. These aspects of the preferred and alternative embodiments of the present invention are in contrast to the prior art systems described above, in which a wrong local time is presented to all users in all cells on the “wrong” side of a time zone border, or (in the case wherein the prior art systems uses a boundary bit), where all users in the system get an indication that the local time received by the SCR is ambiguous.

It will be appreciated when a prior art SCR is used in the simulcast radio communication system 200 having the protocol implemented as described herein, the fixed portion of the system by itself provides some of the above described benefits to the prior art SCRs. In particular, those prior art SCRs operated in regions of non-time zone boundary cells will essentially always show the correct local time, while prior art SCRs operating in the boundary region within the heavy line shown in FIG. 2 will alternatively recover CTZ time, then ETZ time. What is presented to the user in such a situation depends on the design of the prior art SCR, but will likely be a time that changes every period. Thus, the use of the fixed system portion of the invention provides benefits for both prior art SCRs and the SCRs 231–236 as described herein.

Figure 3:
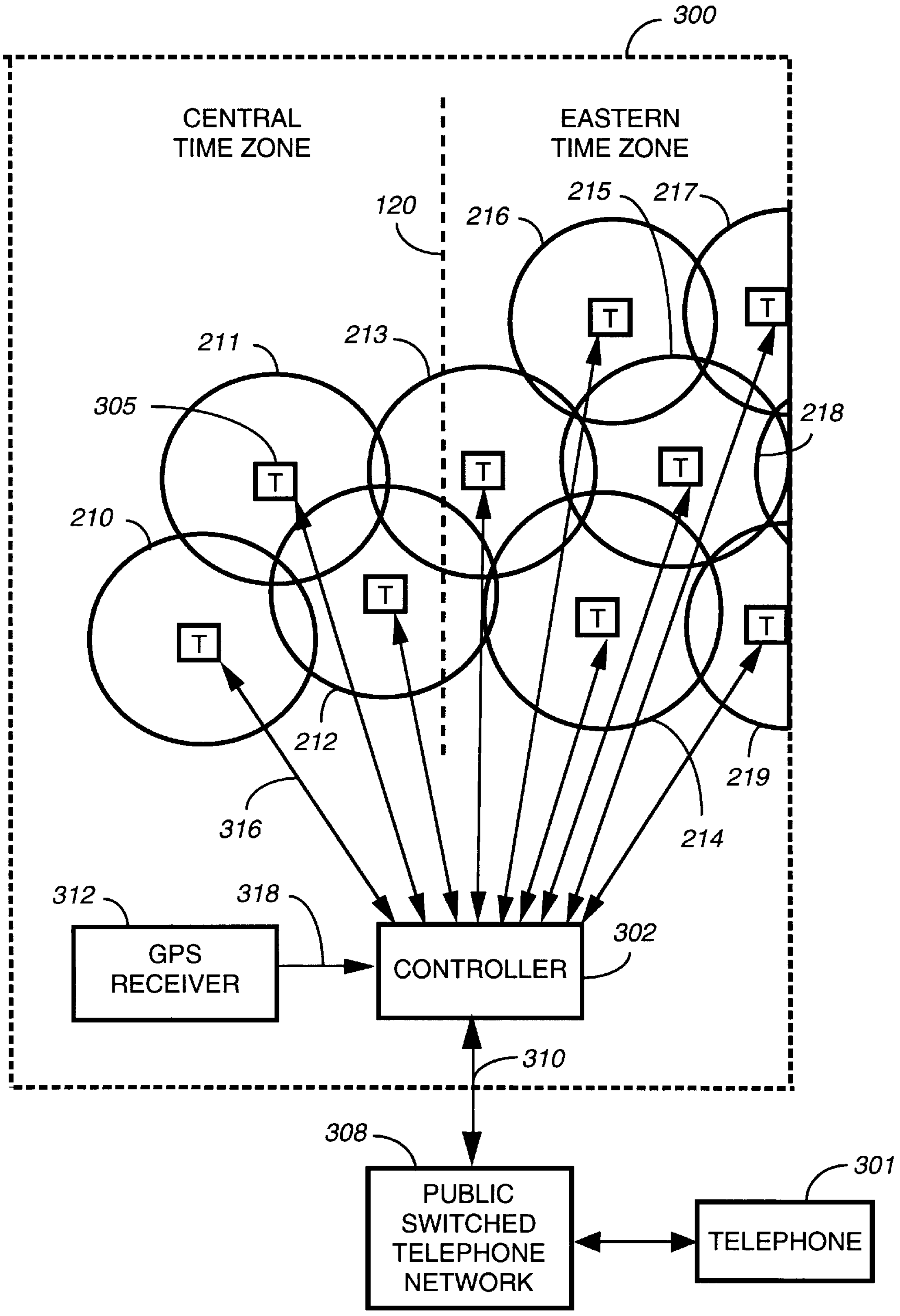
FIG. 3 is an electrical block diagram of the fixed portion of the simulcast radio communication system described with reference to FIG. 2, in accordance with the preferred and alternative embodiments of the present invention.

Referring to FIG. 3, an electrical block diagram of a fixed portion 300 of the simulcast radio communication system 200 is shown, in accordance with the preferred and alternative embodiments of the present invention. The fixed portion 300 of the simulcast radio communication system 200 comprises a system controller 302, a Global Positioning System (GPS) receiver 312, transmitters 305, and communication links 316. A message input device, such as a conventional telephone 301, is connected through a conventional switched telephone network (STN) 308 by conventional telephone links 310 to the system controller 302. The system controller 302 oversees the operation of a plurality of radio frequency (RF) transmitters/receivers and receivers that include the ten transmitters 305 for the ten cells 210–219, through one or more communication links 316, which typically are twisted pair telephone wires, and additionally can include RF, microwave, or other high quality audio communication links. The system controller 302 functions to encode and schedule messages and telephone calls, which can include such information as two way real time telephone conversations, stored analog voice messages, digital alphanumeric messages, and response commands, for transmission by the radio frequency transmitter of the transmitter/receivers to a plurality of SCRs, including the SCRs 231–236 shown in FIG. 2. The system controller 302 further functions to decode inbound messages, including inbound portions of telephone calls, unsolicited messages and scheduled response messages, received by the radio frequency transmitter/receivers or receivers from the plurality of SCRs.

It will be appreciated that the SCRs, including SCRs 231–236, are one of several types of two-way radios, including portable or mobile telephones, two way pagers, or conventional or trunked mobile radios which optionally have data terminal capability designed in. Each of the SCRs assigned for use in the simulcast radio communication system 200 has an address assigned thereto which is a unique selective call address. The address enables the transmission of a message from the system controller 302 only to the addressed SCR, and identifies messages and responses received at the system controller 302 from an SCR. Furthermore, each of one or more of the SCRs can have a unique telephone number assigned thereto, the telephone number being unique within the STN 308. A list of the assigned selective call addresses and correlated telephone numbers for the SCRs is stored in the system controller 302 in the form of a subscriber data base.

Figure 4:
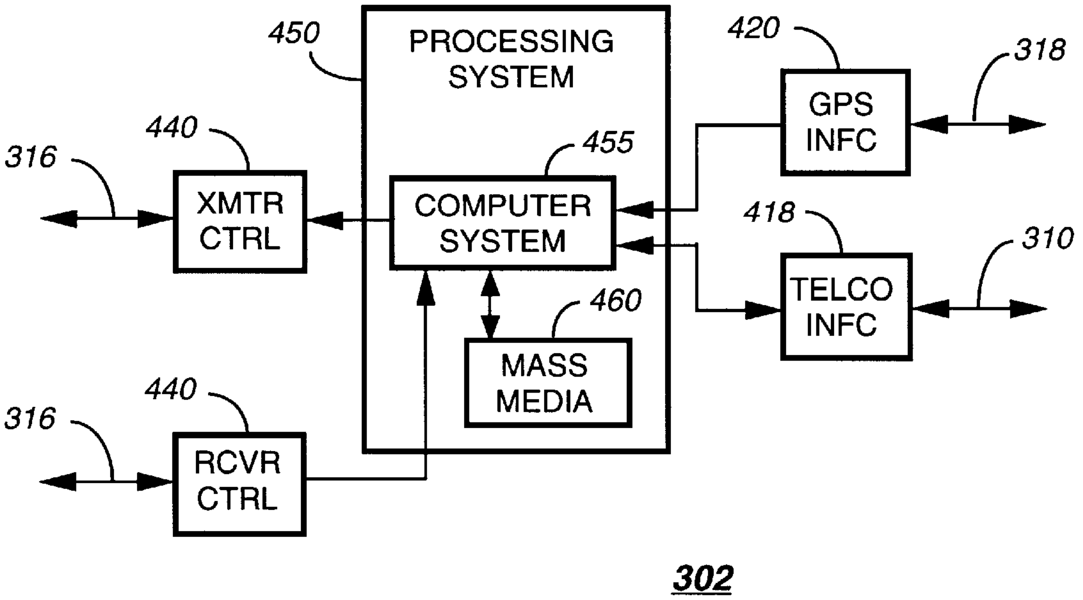
FIG. 4 is an electrical block diagram of a system controller used in a fixed portion of the simulcast radio communication system described with reference to FIG. 2, in accordance with the preferred and alternative embodiments of the present invention.

Referring to FIG. 4, an electrical block diagram of the system controller 302 is shown, in accordance with the preferred and alternative embodiments of the present invention. The system controller 302 comprises a processing system 450, a transmitter controller 440, a receiver interface 430, a GPS interface 420 and an input interface 418. The processing system 450 comprises a computer system 455 coupled to a mass media 460. The mass media 460 is preferably a conventional hard disk that stores sets of program instructions that control the computer system 455. The processing system 450 comprises other conventional devices not shown in FIG. 4, such as a clock reference, I/O drivers, and random access memory. The sets of program instructions comprise unique sets of program instructions which control the computer system 455 to perform the unique functions described in more detail herein. The portions of the system controller 302 shown in FIG. 4 are conventional portions of a model WMG™ system controller manufactured by Motorola, Inc. The transmitters 205 and GPS receiver 312 are conventional devices.

It will be appreciated that the sets of program instructions that provide the unique functions described herein could alternatively be stored in other types of memory, such as read only memory (ROM), and that other system controllers could be use.

The GPS receiver 312 receives from Global Positioning System satellites information from which CTZ and ETZ time is determined. This information is coupled to the system controller 302 by a conventional data link 318. The system controller 302 processes this information and uses it to include the ETZ time in a block information word of at least one phase of every cycle of a first set of FLEX protocol information that is generated by the system controller 302. The system controller 302 uniquely couples the first set of FLEX protocol only to the transmitters 305 for cells 214–219, and all other cells in the ETZ portion of the simulcast radio communication system 200 that are not time zone boundary cells (not shown in FIGS. 1–3). Similarly, the system controller 302 includes the CTZ time in the same block information word of the same phases of every cycle of a second set of FLEX protocol information that is generated by the system controller 302. The system controller 302 uniquely couples the second set of FLEX protocol only to the transmitters 305 for cells 211–212, and all other cells in the CTZ portion of the simulcast radio communication system 200 that are not time zone boundary cells (not shown in FIGS. 1–3). Uniquely, the system controller 302 alternately includes the CTZ time and ETZ times in the same block information word of the same phases of every cycle of a third set of FLEX protocol information that is generated by the system controller 302. The system controller 302 uniquely couples the third set of FLEX protocol only to the transmitters 305 for time zone boundary cells 211–212, and all other time zone boundary cells in the simulcast radio communication system 200.

Figure 5:
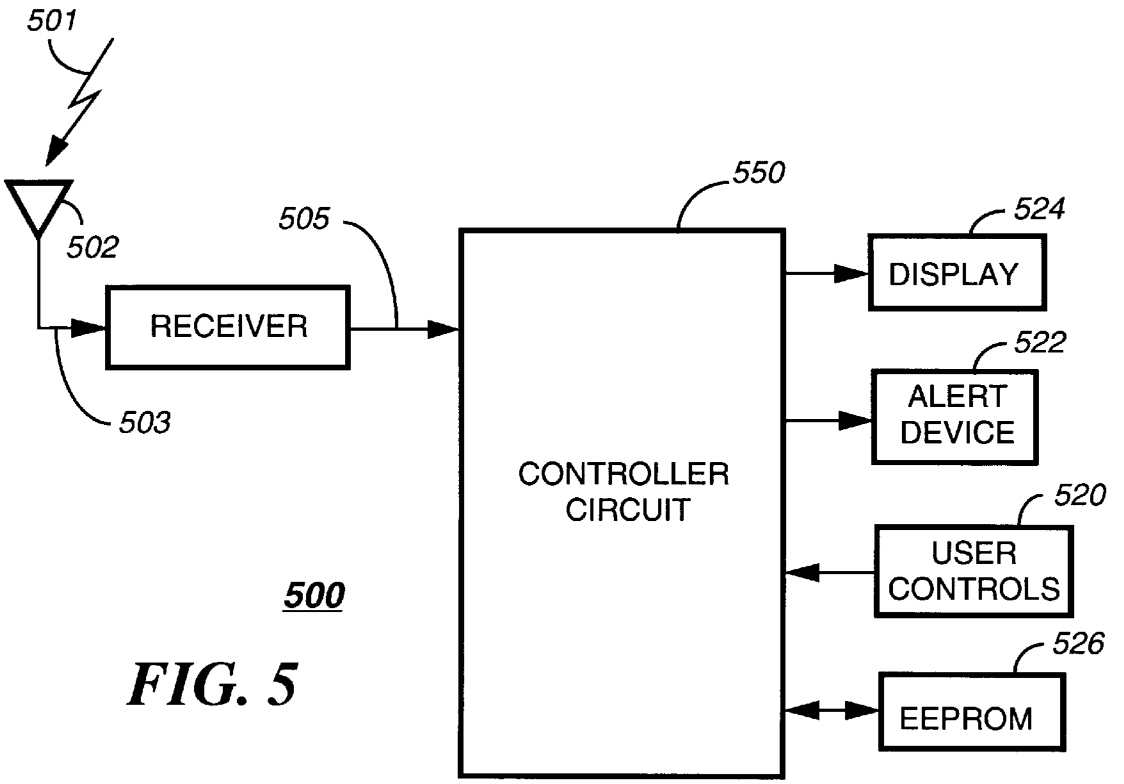
FIG. 5 is an electrical block diagram of a selective call radio, in accordance with the preferred and alternative embodiments of the present invention.

Referring to FIG. 5, an electrical block diagram of a selective call radio 500 is shown, in accordance with the preferred and alternative embodiments of the present invention. The selective call radio 500 is a modified ADVISOR Elite™ Word Message Pager manufactured by Motorola, Inc., and is representative of SCRs 231–236. The selective call radio 500 includes an antenna 502 for intercepting a radiated signal 501, which converts the radiated signal 501 to a conducted radio signal 503 that is coupled to a receiver 504, wherein the conducted radio signal 503 is received. The receiver 504 generates a demodulated signal 505 that is coupled to controller circuit 550. The controller circuit 550 is coupled to a display 524, an alert 522, a set of user controls 520, and an electrically erasable read only memory (EEPROM) 526. The controller circuit 550 is coupled to an EEPROM 526 for storing an embedded address stored therein during a maintenance operation and for loading the embedded address during normal operations of the radio 500. The controller circuit 550 comprises a conventional microprocessor having a central processing unit (CPU), a read only memory (ROM), and a random access memory (RAM).

A message processor function of the microprocessor 560 decodes outbound messages (messages intercepted by SCRs), and processes an outbound message when an address received in the address field of the outbound signaling protocol matches the embedded address stored in the EEPROM 526, in a manner well known to one of ordinary skill in the art for a selective call radio. An outbound message that has been determined to be for the radio 500 by the address matching is processed according to the contents of the outbound message and according to modes set by manipulation of the set of user controls 520, in a conventional manner, except for the recovery of local time information, as described herein. An alert signal is typically generated when an outbound message includes user information. The alert signal is coupled to the alert device 522, which is typically either an audible or a silent alerting device.

When the outbound message includes alphanumeric or graphic information, the information is coupled to a display 524 at a time determined by manipulation of the set of user controls 520. The controller circuit 550 comprises a conventional microprocessor central processing unit (CPU) and an instruction memory that controls the operation of the CPU and thus the operation of the controller circuit 500. The instruction memory is configured to comprise a unique set of conventional microprocessor instructions that operate the controller circuit 550 to perform the unique functions described herein. The controller circuit 550 is preferably a single integrated circuit, but can alternatively be several integrated circuits. It will also be appreciated that the controller circuit can alternatively be implemented as state machine instead of a microprocessor based circuit.

Figure 6:
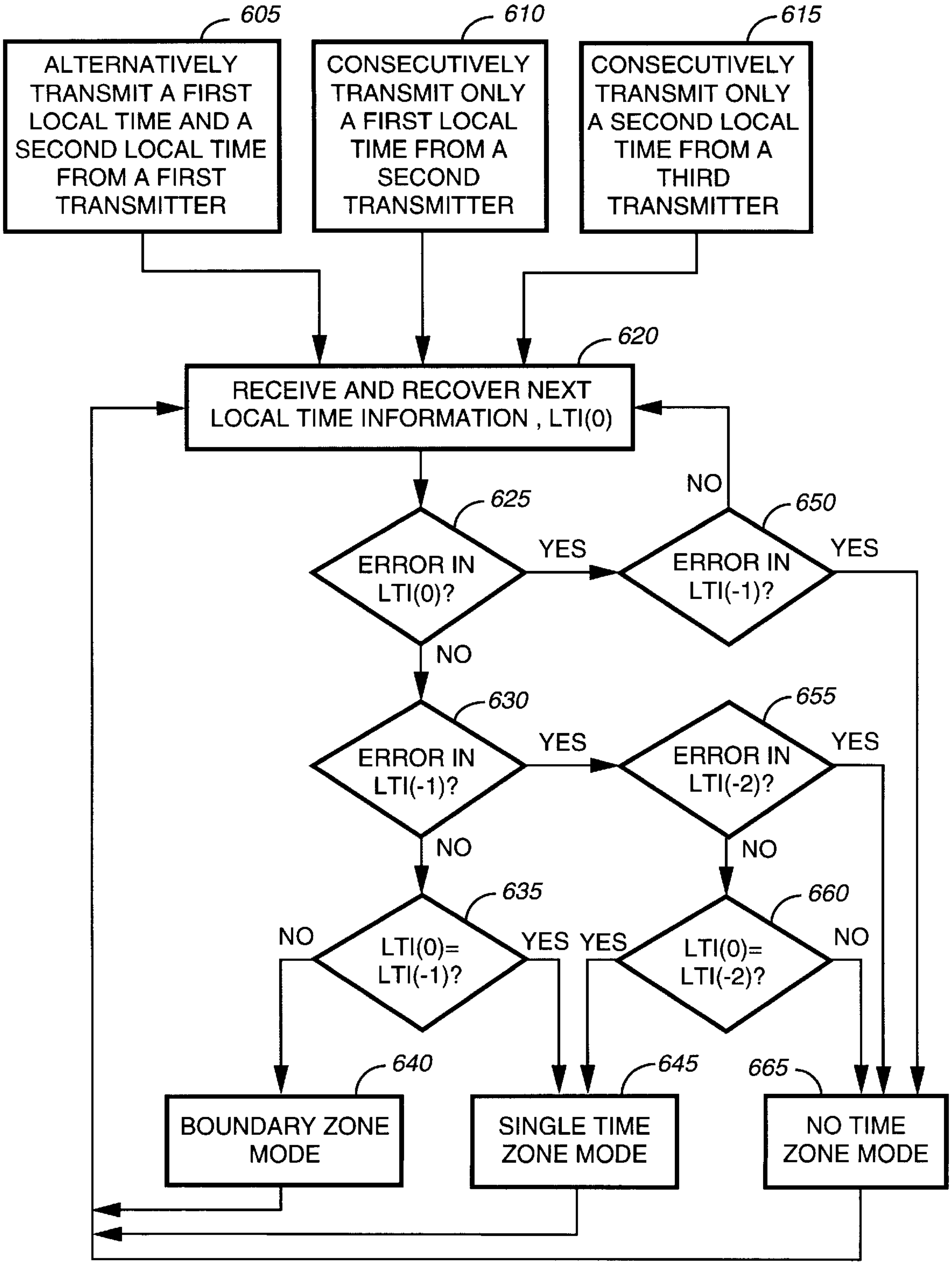
FIG. 6 is a flow chart of a method used in the simulcast radio communication system described with reference to FIG. 2, in accordance with the preferred embodiment of the present invention.

Referring to FIG. 6, a flow chart shows a method used in the simulcast radio communication system 200 for providing improved local time information in a signaling protocol, in accordance with the preferred embodiment of the present invention. At step 605, in a fixed portion 300 of the radio communication system 200, and preferably in a first transmitter of the fixed portion of the radio communication system 300, the first transmitter alternatively transmits a radio signal including a first local time and a second local time in a predetermined protocol position that occurs periodically in the signaling protocol, wherein the first local time and second local time differ by the time zone interval as described above (−56 or +64 minutes in the example described; other values are possible depending on the protocol used and the actual time zone time differences). In the example described herein, the transmitters for cells 212–213 are first transmitters.

At step 610, a second transmitter consecutively transmits only the first local time during the periodically occurring predetermined protocol position, and at step 615 a third transmitter consecutively transmits only the second local time from a third transmitter during the periodically occurring predetermined protocol position. In the example described herein, the transmitters for cells 210–211 are second transmitters and the transmitters for cells 214–219 are third transmitters.

Transmissions are received by a selective call radio (SCR) from which local time information is recovered by the controller circuit 550 within each predetermined protocol position. The SCR is designed in accordance with the preferred embodiment of the present invention, as described herein with reference to FIG. 6. Within a next transmission, a local time information, identified as LTI(0), is recovered by the controller circuit 550 at step 620, and the LTI(0) is checked by the controller circuit 550 for errors at step 625. Steps 625–665 are performed by the controller circuit 550. When there are no errors found in LTI(0), a next previous local time information, LTI(−1) is checked to determine whether it was received with errors, at step 630. When LTI(−1) has also been received without errors, a determination is made at step 635 as to whether LTI(0) is equivalent to LTI(−1), wherein equivalency means that the time zone times differ only by the duration of the period between transmissions of the predetermined protocol position (four minutes in this example).

When LTI(0) is equivalent to LTI(−1), the local time mode is set to the single time zone mode at step 645, and the time determined from LTI(0) is displayed to the user upon command. Thus, at steps 625, 630, 635, and 645, the single time zone mode is determined when local time information received during the two consecutive transmissions indicates the first local time, and a local time based on LTI(0) is presented during the single time zone mode. The local time is determined from LTI(0) using conventional internal timers that keep the local time updated. When LTI(0) is not equivalent to LTI(−1), then they differ by one time zone interval, as defined above, and the local time mode is set to the boundary zone mode at step 640. The times determined from LTI(0) and from LTI(−1) are displayed to the user upon command by the controller circuit 550. Thus, at steps 625, 630, 635 and 640, the boundary zone mode is determined when local time information received during the two consecutive transmissions differs by the time zone interval, and an indication of two times based on the first local time and the second local time are presented to a user during the boundary zone mode.

When at step 625 one or more errors are found in LTI(0), a determination is made at step 650 as to whether there are errors in LTI(−1 ), and when one or more errors are also found in LTI(−1), the local time mode is set to a no time zone mode at step 665, and no local time is presented to the user upon command; instead an error message is displayed. As an alternative to presenting the error message, the user can optionally choose to continue to present the local time using the local time mode most recently selected at steps 640 or 645 during the no time zone mode. When at step 650 no errors are found in LTI(−1), then the local time mode is not altered and the next received local time information is awaited at step 620.

When at step 630 one or more errors are found in LTI(−1) after 20 having found no errors in LTI(0) at step 625, then a determination is made as to whether one or more errors were found in LTI(−2), at step 655. When one or more errors are determined to have been in LTI(−2) at step 655, the local time mode is set to the no time zone mode at step 665. When at step 655 no errors are found in LTI(−2), then a determination is made at step 660 as to whether LTI(0) is equivalent to LTI(−2), wherein equivalency means that the time zone times differ only by two durations of the period between transmissions of the predetermined protocol position. When at step 660, LTI(0) is not equivalent to LTI(−2), the local time mode is set to the no time zone mode at step 665. When at step 660, LTI(0) is equivalent to LTI(−2), the local time mode is set to the single time zone mode at step 645, and the time determined from LTI(0) is displayed to the user upon command. Thus, at steps 625, 630, 645, 655, and 660, a single time zone mode is determined when local time information received during two non-consecutive transmissions of three consecutive transmissions of the predetermined protocol position indicate the first local time and a remaining local time information indicates errors, and a local time based on LTI(0) is presented during the single time zone mode.

After the local time mode is set at any one of the steps 640, 645, 665, a next local time information is awaited at step 620.

Preferably, the predetermined protocol position is in a block information word in a phase of a protocol of the FLEX family of protocols, but it will be appreciated that it could be within, for example, a cycle of a synchronous protocol other than a FLEX protocol.

Figure 7:
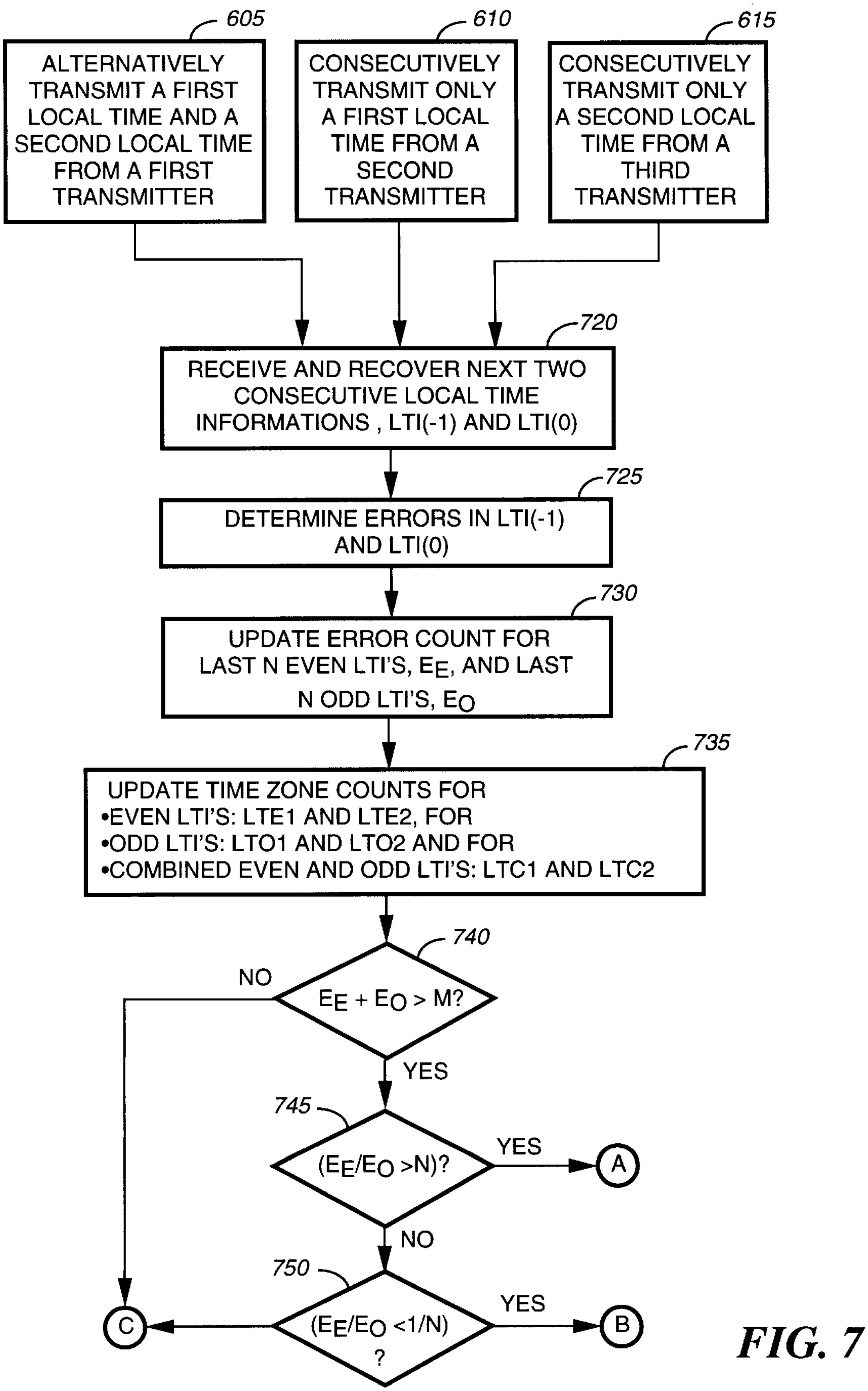
FIGS. 7 and 8 are a flow chart of a method used in the simulcast radio communication system described with reference to FIG. 2, in accordance with an alternative embodiment of the present invention.
Figure 8:
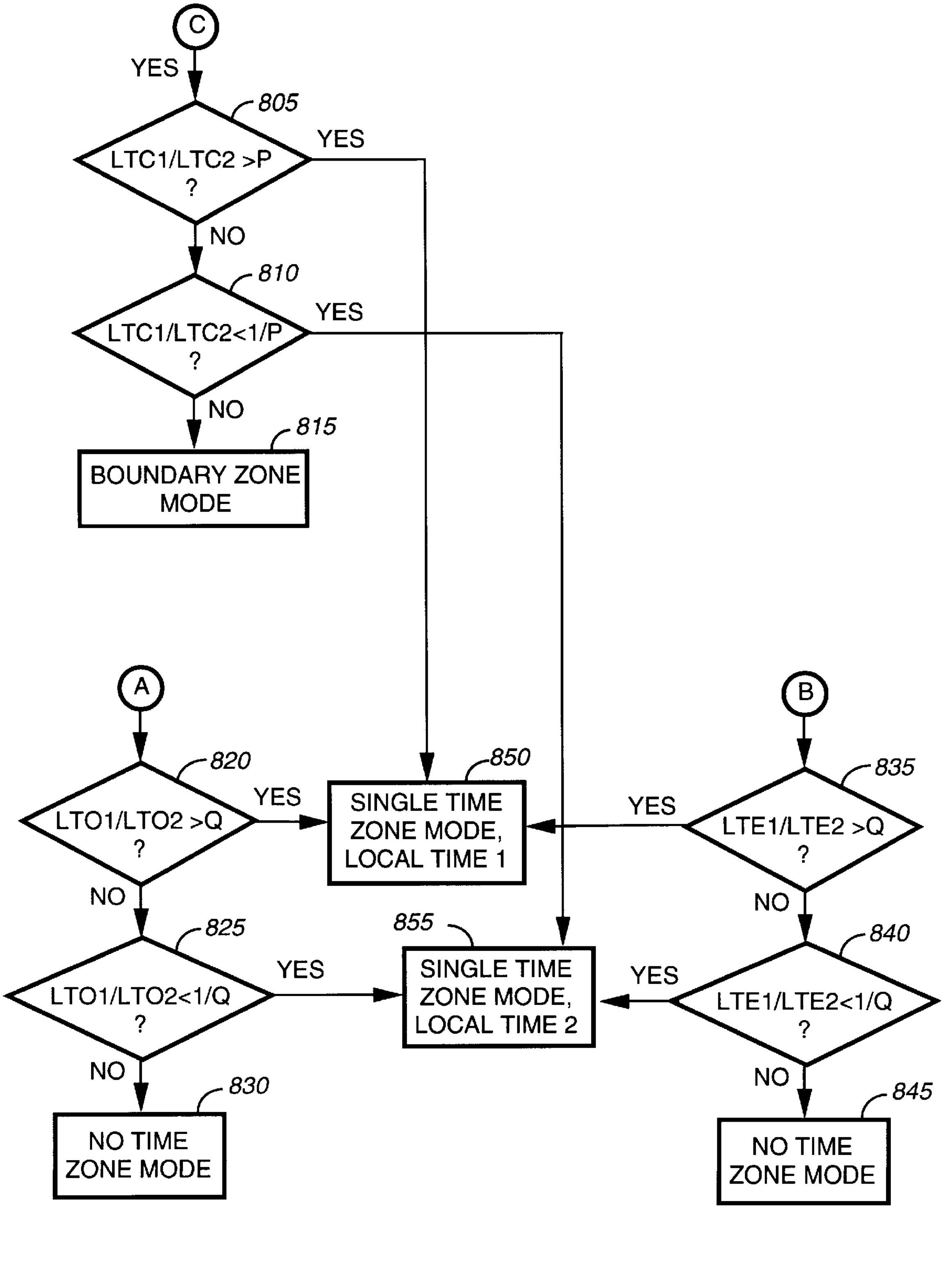

Referring to FIGS. 7 and 8, a flow chart shows a method used in the simulcast radio communication system 200 for providing improved local time information in a signaling protocol, in accordance with the alternative embodiment of the present invention. This method adds hysteresis into the decision of which time zone mode to select and which single time zone time to select, to avoid transitions that may be undesirable in some situations. At steps 605–615, the same radio signals are transmitted as described with reference to FIG. 6. At step 720, an SCR receives the predetermined, periodic protocol positions included in one or more of the radio signals transmitted in steps 605–615. The SCR is designed in accordance with the alternative embodiment of the present invention as described herein with reference to FIGS. 7 and 8. At step 720, the SCR receives two next consecutive local time informations, LTI(−1) and LTI(0), from two consecutive predetermined protocol positions. Steps 725–750 and 805–855 are performed by the controller circuit 550 of the SCR. At step 725, any errors that occur in LTI(−1) and LTI(0) are determined. Preferably, the errors are all the bit errors detected within the words that include LTI(−1) and LTI(0), including correctable bit errors. Other error measurements could alternatively be used, for example, a count of simply whether or not any error was detected in each word including the local time information, or, a measure of the bit quality of each of the bits that form the local time information. The errors associated with LTI (−1) and LTI(0) are used to update two total error counts, $E_E$ and $E_O$, at step 730. $E_E$ represent the total count of errors in R previous even LTIs, LTI(0), LTI(−2), . . . LTI(−2R+2) (also referred to as the last R even LTIs). $E_O$ represents the total count of errors in R previous odd LTIs, LTI(−1), LTI(−3), . . . LTI(−2R+1) (also referred to as the last R odd LTIs). It will be appreciated that "even" and "odd" do not necessarily refer to a number assigned to the predetermined protocol position. For example, in the FLEX protocol used as the example herein, the local time information is received once in each cycle, and the cycles are numbered 0 to 14 in each hour. Thus, in the case of the FLEX protocol, the last R even LTIs can include FLEX cycles having even and odd numbers.

When a first or second local time (for example, CTZ time or ETZ time) is received within LTI(0) or LTI(−1), time counts are updated at step 735. The determination of whether a received local time information is a first or second time is determined by whether the local time information is within a predictable plurality of time zone intervals (as defined above) of one of the first and second local times established at the previous receipt of two consecutive local times. For example, using the period of four minutes between receipt of LTIs, and a single time zone mode at LTI(−2) with the local time set to a first local time of 3:12 PM, then when LTI(0) is received as 3:20 PM (+8 minutes with respect to 3:12 PM) it is a first time zone time within two time zone intervals of 3:12 PM, and when LTI(0) is received as 2:20 PM (−52 minutes with respect to 3:12 PM), it is a second time zone time within two time zone intervals of 3:12 PM. The time counts that are updated are counts of first and second local times (LTE1, LTE2) for the even LTIs, first and second local times (LTO1, LTO2) for the odd LTIs and first and second local times (LTC1, LTC2) for total counts for the combination of the even and odd LTIs. Thus, six counts are updated at step 730, identified as, respectively, LTE1, LTE2, LTO1, LTO2, LTC1, and LTC2. It will be appreciated that under normal conditions LTE1+LTE2=R, LTO1+LTO2=R, LTC1=LTO1+LTE1, and LTC2=LTO2+LTE2. Thus, the six counts can typically be determined from R and just two counts, such as LTO1 and LTE1. The term "updating" used for steps 730 and 735 means that the values for the newly received LTIs, LTI(0) and LTI(−1), are added to the counts, and the values for the oldest two LTIs, LTI(2R+2) and LTI(2R+1) are removed from the counts.

Under certain unique error conditions, $E_E$ and $E_O$ are determined differently than described above: when LTE1 and LTE2 or when LTO1 and LTO2 are both missed during a receipt of one of the predetermined protocol positions, then $E_E$ or $E_O$, respectively, is increased by a predetermined amount, which in this example is 3. Missing can occur, for example, the received radio signal drops below a recoverable signal strength during a significant portion of the signal that includes the predetermined protocol position.

For clarity, examples of these counts are described. As a first example, when SCR 233 has been operating in the location shown in FIG. 2 for more than 40 minutes, and R=5, then a typical set of counts is LTE1=5, LTE2=0, LTO1=0, LTO2=5, LTC1=5, and LTC2=5. Errors at this location will typically be low, so that typical counts of errors will be $E_E$=0 and $E_O$=0. As another example, when SCR 231 has been operating in the location shown in FIG. 2 for more than 40 minutes, and R=5, then a typical set of counts is LTE1=5, LTE2=0, LTO1=5, LTO2=0, LTC1=10, and LTC2=0. Errors at this location will typically be low, so that typical counts of errors will be $E_E$=0 and $E_O$=0. As yet another example, when SCR 232 has been operating in the location shown in FIG. 2 for more than 40 minutes, and R=5, then a typical set of counts is LTE1=5, LTE2=0, LTO1=2, LTO2=3, LTC1=7, and LTC2=3. Errors at this location will typically be higher, because during the odd LTIs, two radio signals having different values of local times will be received simultaneously, with strengths that differ depending on the propagation path to the SCR 232, so that typical counts of errors could be $E_E$=0 and $E_O$=4.

At step 740, when the sum of the counts of even errors and odd errors, $E_E+E_O$, is greater than a first predetermined value, M, and when either a ratio of $E_E/E_O$ is greater than a second predetermined value, N at step 745, or when the ratio of $E_E/E_O$ is less than 1/N at step 750, then the counts of first and second even local times, LTE1 and LTE2 or the counts of first and second odd local times, LTO1 and LTO2 are used to determine the time zone mode, at steps 820–855. However, when at step 740 $E_E+E_O$, is not greater than M or when the ratio of $E_E/E_O$ is not greater than N at step 745 and the ratio of $E_E/E_O$ is not less than 1/N at step 750, then the counts of first and second combined local times, LTC1 and LTC2 are used to determine the time zone mode, at steps 805–815 and 850, 855. As an example, M is 2 and N is 3.

At step 805, when a ratio of LTC1/LTC2 is greater than a third predetermined value, P, then the time zone mode is determined, at step 850, to be the single time zone having the first local time. At step 805, when the ratio of LTC1/LTC2 is not greater than P, and when the ratio of LTC1/LTC2 is less than 1/P at step 810, the time zone mode is determined, at step 855, to be the single time zone mode having the second local time. When the ratio of LTC1/LTC2 is not less than 1/P at step 810, then the time zone mode is determined to be the boundary zone mode at step 815, with the same results as described above with reference to step 640 of FIG. 6. As an example, P is 3, and R is 5, in which case a single time zone mode is determined when 8 or more of the 10 even and odd local times are the same (either LTC1/LTC2=8/2 or 2/8, which is greater than 3 or less than 1/3), but the boundary zone mode is determined when 7 or less are the same (either LTC1/LTC2=7/3 or 3/7, which is less than 3 or greater than 1/3).

When at step 740, $E_E+E_O$ is greater than M and when the ratio of $E_E/E_O$ is greater than N at step 745, then at step 820, when a ratio of LTO1/LTO2 is greater than a fourth predetermined value, Q, the time zone mode is determined, at step 850, to be the single time zone having the first local time. At step 825, when the ratio of LTO1/LTO2 is not greater than Q, and the ratio of LTO1/LTO2 is less than 1/Q at step 825, then the time zone mode is determined, at step 855, to be the single time zone mode having the second local time. When the ratio of LTO1/LTO2 is not less than 1/Q at step 825, then the time zone mode is determined to be the no time zone mode at step 830. As an example, Q is 3, and R is 5, in which case a single time zone mode is determined when 4 or more of the 5 even or odd local times are the same (e.g., LTE1/LTE2=4/1 or 1/4, which is greater than 3 or less than 1/3), and the no time zone mode is determined when 3 are the same (e.g., either LTE1/LTE2=3/2 or 2/3, which is less than 3 or greater than 1/3).

When at step 740, $E_E+E_O$ is greater than M and when the ratio of $E_E+E_O$ is not greater than N at step 745 but the ratio of $E_E+E_O$ is less than 1/N at step 750, then at step 835, when a ratio of LTE1/LTE2 is greater than Q, the time zone mode is determined, at step 850, to be the single time zone having the first local time. At step 835, when the ratio of LTE1/LTE2 is not greater than Q, and the ratio of LTE1/LTE2 is less than 1/Q at step 840, then the time zone mode is determined, at step 855, to be the single time zone mode having the second local time. When the ratio of LTE1/LTE2 is not less than 1/Q at step 840, then the time zone mode is determined to be the no time zone mode at step 845.

It will be appreciated, that in another alternative embodiment, another set of decisions could be made after steps 805 and 810 that determine the boundary zone mode only when the ratio of LTC1/LTC2 is less than a fifth predetermined value T or when the ratio of LTC1/LTC2 is more than the reciprocal of the fifth predetermined value, 1/T. In this alternative, when these two tests fail, the no time zone mode is determined. As an example, P is 5, T is 2, and R is 5, in which case a single time zone mode is determined when 9 or more of the 10 even and odd local times are the same (e.g., LTC1/LTC2=9/1 or 1/9, which is greater than 5 or less than 1/5), and the boundary zone mode is determined when there are six of one local time and 4 of the other or there are 5 of each (e.g., LTC1/LTC2=6/4 or 4/6 or 5/5, which is less than 2 or greater than 1/2), and in all other cases the no time zone mode is determined.

It will be appreciated that the same benefits of hysteresis described above can be achieved by determining the characteristics described herein (counts of errors and counts of first and second local times) for local time informations received in even and odd periods of the predetermined protocol position over a plurality of periods, using other sequences and other types of steps than those described herein with reference to FIGS. 7 and 8. For example, because R is predetermined, the steps 805, 810, 820, 825, 835, and 840 can be replaced by a comparison of one count (e.g., LTO1 in step 820) to a value, because the value LTO2 is determined by LTO1 and R.

It will be further appreciated that some key aspects of the present invention in accordance with the alternative embodiment can be more generically described as follows. The method used in the selective call radio includes steps of 1) recovering transmissions of a predetermined protocol position that includes local time information and that occur periodically in a signaling protocol, 2) comparing characteristics of a first plurality of even local time informations received in even receptions of the predetermined protocol position to characteristics of a second plurality of odd local time informations received odd receptions of the predetermined protocol position, 3) determining a time zone mode based on the characteristics, and 4) presenting at least one of a first and a second local time to a user according to the time zone mode. The characteristics include counts of errors and first and second local times. The first plurality is substantially equal to the second plurality, meaning that the ratio of the pluralities are preferably within a range of 90–110%. This allows for completely missing one in ten local time informations. As an alternative, the pluralities are kept equal even though one local time information is completely missed by retaining an older value.

One method of determining the time zone mode is based on a first ratio of the total count of first local times to the total count of second local times (LTC1/LTC2) received during the odd and even receptions of the predetermined protocol position. A boundary zone mode is determined when the first ratio is not greater than a first predetermined value (e.g., P as described above) or is not less than a reciprocal (1/P) of the first predetermined value, in which case an indication of both the first local time and the second local time is presented to the user during the boundary zone mode. A single time zone mode is determined when the first ratio is greater than the first predetermined value or less than the reciprocal of the first predetermined value. In this case, when the first ratio is greater than the first predetermined value, an indication of the first local time is presented to the user during the single time zone mode, and when the ratio is less than the reciprocal of the first predetermined value, an indication of the second local time is presented to the user during the single time zone mode. Optionally, a count of even errors is determined in the even local time informations and a count of odd errors is determined in the odd local time informations. The determination of the time zone mode based on the first ratio (as described above) is optionally made only when a second ratio of the count of even errors to the count of odd errors is either less than a second predetermined value (e.g., N as described above) or greater than the reciprocal of the second predetermined value. The determination of the time zone mode based on the first ratio (as described above) is optionally made only when a sum of the count of even errors and the count of odd errors is less than or equal to a third predetermined value (e.g., M as described above).

Another method of determining the time zone mode is based on 1) an "odd ratio", which is a ratio of a count of first local times received in the odd local time informations (first odd local times) to a count of second local times received in the odd local time informations (second odd local times), and 2) an "even ratio", which is a ratio of a count of first even local times to a count of second even local times. A single zone mode is determined when one of the odd ratio and even ratio is either greater than a fourth predetermined value (e.g., Q, as described above) or less than a reciprocal of the fourth predetermined value. In this case, when one of the odd and even ratios is greater than the fourth predetermined value, an indication of the first local time is presented to the user, and when one of the odd and even ratios is less than the fourth predetermined value, an indication of the second local time is presented to the user. In this case a count of even errors is determined from the even local time informations and a count of odd errors is determined from the odd local time informations. The determination of the time zone mode based on the odd ratio is made only when a second ratio of the count of even errors to the count of odd errors ($E_E/E_O$)is greater than the second predetermined value. The determination of the time zone mode based on the even ratio is made only when the second ratio is less than a reciprocal of the second predetermined value. The determination of the time zone mode based on the odd ratio or even ratio is optionally made only when a sum of the count of even errors and the count of odd errors is less than or equal to the third predetermined value.

By now it should be appreciated that there has been provided a technique used in fixed portion of a simulcast radio communication system that provides improved local time information in a signaling protocol that is received by a selective call radio near a time zone boundary, wherein a presentation of erroneous local times to a user is largely avoided and no extra bits are required in the signaling protocol. Techniques used in a selective call radio are also described that further improve the reliability of presenting correct local times.

We claim:

1. A method used in a simulcast radio communication system for providing improved local time information, comprising in a fixed portion of the simulcast radio communication system the step of:

alternatively transmitting in a radio signal a first local time and a second local time in a predetermined protocol position that occurs periodically in a signaling protocol, wherein the first local time and second local time differ by a time zone interval.

2. The method according to claim 1, further comprising in a selective call receiver the step of:

receiving two consecutive transmissions of the predetermined protocol position;

determining a boundary zone mode when local time information received during the two consecutive transmissions differs by the time zone interval; and presenting to a user an indication of both the first local time and the second local time during the boundary zone mode.

3. The method according to claim 1, further comprising at least one of the steps of:

consecutively transmitting only the first local time from a second transmitter during the predetermined protocol position; and consecutively transmitting only the second local time from a third transmitter during the predetermined protocol position.

4. The method according to claim 3, comprising in a selective call receiver the steps of:

receiving two consecutive transmissions of the predetermined protocol position;

determining a single time zone mode when local time information received during the two consecutive transmissions indicates the first local time; and presenting the first local time during the single time zone mode.

5. The method according to claim 3, comprising in a selective call receiver the steps of:

receiving three consecutive transmissions of the predetermined protocol position;

determining a single time zone mode when local time information received during two non-consecutive transmissions of the predetermined protocol position indicate the first local time and a remaining local time information indicates one or more errors; and presenting the first local time during the single time zone mode.

6. The method according to claim 1, wherein in the step of alternatively transmitting, the predetermined protocol position is in a block information word of a protocol of a FLEX™ family of protocols.

7. The method according to claim 1, wherein in the step of alternatively transmitting, the predetermined protocol position is in a block information word in a phase of a protocol of a FLEX™ family of protocols.

8. The method according to claim 1, wherein in the step of alternatively transmitting, alternation of the first local time and the second local time is generated within a transmitter.

9. A method used in a selective call radio for providing improved local time information to a user, wherein the selective call radio is used in a simulcast radio communication system, comprising in the selective call radio the steps of:

recovering three consecutive transmissions of a predetermined protocol position that occurs periodically in a signaling protocol, wherein the predetermined protocol position alternatively includes a first local time and a second local time differing by a time zone interval;

determining a boundary zone mode when local time information received during two consecutive of the three consecutive transmissions of the predetermined protocol position differs by the time zone interval; and presenting to a user an indication of both the first local time and the second local time during the boundary zone mode.

10. The method according to claim 9, further comprising in the selective call radio the steps of:

determining a single time zone mode when local time information received during two non-consecutive transmissions of the predetermined protocol position indicates the first local time and a remaining local time information indicates one or more errors; and presenting the first local time during the single time zone mode.

11. The method according to claim 9, further comprising in the selective call radio the steps of:

determining a single time zone mode when local time information received during the three consecutive transmissions of the predetermined protocol position indicates the first local time; and presenting the first local time during the single time zone mode.

12. A selective call radio, comprising:

a receiver that receives a radio signal that includes a signaling protocol;

a controller circuit that recovers three consecutive transmissions of a predetermined protocol position that occurs periodically in a signaling protocol, wherein the predetermined protocol position alternatively includes a first local time and a second local time differing by a time zone interval, and determines a boundary zone mode when local time information received during two consecutive of the three consecutive transmissions of the predetermined protocol position differs by the time zone interval; and a display that presents to a user an indication of both the first local time and the second local time during the boundary zone mode.

13. The selective call radio according to claim 12, wherein the controller circuit further determines a single time zone mode when local time information received during two non-consecutive transmissions of the predetermined protocol position indicates the first local time and a remaining local time information indicates one or more errors; and presents the first local time during the single time zone mode.

14. The selective call radio according to claim 12, wherein the controller circuit further determines a single time zone mode when local time information received during the three consecutive transmissions of the predetermined protocol position indicates the first local time; and presents the first local time during the single time zone mode.

15. A method used in a selective call radio for providing improved local time information to a user, wherein the selective call radio is used in a simulcast radio communication system, comprising in the selective call radio the steps of:

recovering transmissions of a predetermined protocol position that includes local time information and that occurs periodically in a signaling protocol;

comparing characteristics of a first plurality of even local time informations received in even receptions of the predetermined protocol position to characteristics of a second plurality of odd local time informations received in odd receptions of the predetermined protocol position;

determining a time zone mode based on the characteristics; and presenting at least one of a first local time and a second local time to the user according to the time zone mode.

16. The method according to claim 15, wherein the first plurality is substantially equal to the second plurality.

17. The method according to claim 15, wherein the step of determining the time zone mode comprises the step of determining the time zone mode based on a ratio of a total count of first local times to a total count of second local times received during the even and odd receptions of the predetermined protocol position.

18. The method according to claim 17, wherein the step of determining the time zone mode comprises the step of determining a boundary zone mode when the ratio is greater than a first predetermined value or less than a reciprocal of the first predetermined value, and wherein the step of presenting comprises the step of presenting to the user an indication of both a first local time and a second local time during the boundary zone mode.

19. The method according to claim 17, wherein the step of determining the time zone mode comprises the step of determining a single time zone mode when the ratio is less than a first predetermined value or greater than a reciprocal of the first predetermined value, and wherein the step of presenting comprises the steps of:

presenting to the user an indication of the first local time during the single time zone mode when the ratio is less than the first predetermined value; and presenting to the user an indication of the second local time during the single time zone mode when the ratio is greater than the reciprocal of the first predetermined value.

20. The method according to claim 17, further including the step of:

determining a count of even errors in the even local time informations and a count of odd errors in the odd local time informations, and wherein the step of determining the time zone mode is performed when a ratio of the count of even errors to the count of odd errors is either less than a second predetermined value or greater than the reciprocal of the second predetermined value.

21. The method according to claim 17, further including the step of:

determining a count of even errors in the even local time informations and a count of odd errors in the odd local time informations, and wherein the step of determining the time zone mode is performed when a sum of the count of even errors and the count of odd errors is less than or equal to a third predetermined value.

22. The method according to claim 15, wherein the step of determining the time zone mode comprises the step of determining the time zone mode based on one of an odd ratio of a count of first odd local times to a count of second odd local times and an even ratio of a count of first even local times to a count of second even local times received during the odd and even receptions of the predetermined protocol position.

23. The method according to claim 22, wherein the step of determining the time zone mode comprises the step of determining a single zone mode when one of the odd ratio and even ratio is either greater than a fourth predetermined value or less than a reciprocal of the fourth predetermined value, and wherein the step of presenting comprises the steps of:

presenting to the user an indication of the first local time when the one of the odd and even ratio is greater than the fourth predetermined value; and presenting to the user an indication of the second local time when the one of the odd and even ratio is less than the fourth predetermined value.

24. The method according to claim 22, further including the step of:

determining a count of even errors from the even local time informations and a count of odd errors from the odd local time informations, and wherein in the step of determining the time zone mode, the odd ratio is used when a ratio of the count of even errors to the count of odd errors is greater than a second predetermined value, and the even ratio is used when the ratio of the count of even errors to the count of odd errors is less than a reciprocal of the second predetermined value.

25. The method according to claim 22, further including the step of:

determining a count of even errors from the even local time informations and a count of odd errors from the odd local time informations, and wherein the step of determining the time zone mode is performed when a sum the count of even errors and the count of odd errors is less than or equal to a third predetermined value.

26. The method according to claim 15, wherein the characteristics comprise one of a count of one of first and second local times received in one of the first plurality of even local time informations and the second plurality of odd local time informations.

27. The method according to claim 15, wherein the characteristics comprise even errors received in the first plurality of even local time informations and odd errors received in the second plurality of odd local time informations.

28. A selective call radio, comprising:

a receiver that receives a radio signal that includes a signaling protocol;

a controller circuit that recovers transmissions of a predetermined protocol position that includes local time information and that occurs periodically in a signaling protocol, compares characteristics of a first plurality of even local time informations received in even receptions of the predetermined protocol position to characteristics of a second plurality of odd local time informations received in odd receptions of the predetermined protocol position, and determines a time zone mode based on the characteristics; and a display that presents to a user an indication of the local time based on the time zone mode.

* * * * *